Figures 1, 2:
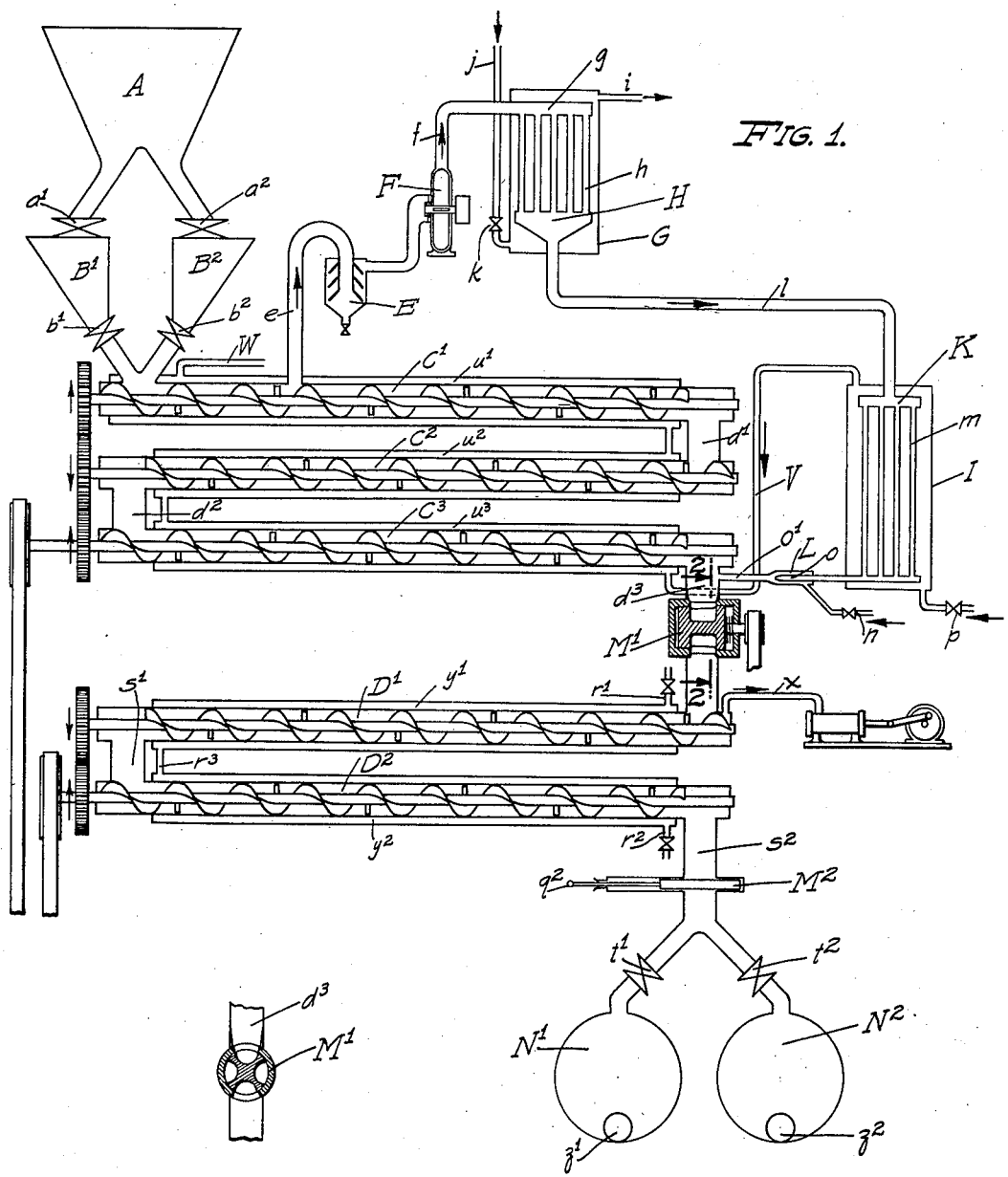

July 17, 1928. 1,677,406

J. PERL

PROCESS FOR THE SACCHARIFICATION OF CELLULOSE BEARING MATERIAL

Filed July 3, 1925

Inventor

JOHN PERL.

By A. B. Bowman

Attorney

Patented July 17, 1928.

1,677,406

UNITED STATES PATENT OFFICE.

JOHN PERL, OF LOS ANGELES, CALIFORNIA, ASSIGNOR TO M. M. CORY, OF SAN DIEGO, CALIFORNIA.

PROCESS FOR THE SACCHARIFICATION OF CELLULOSE-BEARING MATERIAL.

Application filed July 3, 1925. Serial No. 41,246.

My invention relates to a process and apparatus for the saccharification of cellulose bearing material and The principal objects of my invention are:

First. To control and overcome the destructive effects of the heat of reaction caused by the absorbing or enriching of the catalysts during concurrent saccharification of cellulose bearing material.

Second. To easily and thoroughly control the concentration of the acid catalysts.

Third. In the saccharification of cellulose bearing material to be able to reduce the amount of water present to the practical minimum and materially below that required by any other known method.

Fourth. To avoid some of the destructive side reactions which produce undesirable compounds, and Fifth. To more easily saccharify and make it possible to, more easily, subsequently hydrolyze the cellulose acid-gel, by boiling with weak acid solutions.

Numerous processes have been proposed and tried to convert, by hydrolysis with acid catalysts, cellulose bearing materials into invert sugars, glucose, dextrose and the like. In the process of hydrolyzing with acid catalysts a certain concentration of the acid is required because it is necessary first to gelatinize the cellulose component of cellulose bearing materials, before further hydrolysis proceeds to a stage of cellobiose, dextrine, glucose and finally dextrose, (this latter being the last carbohydrate of the highest degree of hydration). When concentration of the acid catalyst is below a certain minimum, such gelatinization cannot take place, and the yields are small. Thus, it has been shown by several experimenters that the concentration of acid catalysts must exceed forty per cent (40%) in case of hydrochloric acid, and seventy per cent (70%) in the case of sulphuric acid, in order to start an efficient gelatinization in which case yields are obtained based on the cellulose weight that almost approach the theoretically possible yields.

However, in past efforts to make use of these facts, very great obstacles have been met with, in that it was found that a certain minimum weight of water was required in addition to the eleven per cent (11%) theoretically needed for complete hydration. It has been proposed to supply such water requirements either by employing a superabundance of the concentrated liquid acid catalyst or by utilizing moisture in the cellulose bearing material, which moisture is saturated with concentrated gaseous acids until its minimum concentration is in equilibrium with the water necessary to absorb the acid gas and the water needed as minimum for the process. The use of a superabundance of strong acid is expensive and not practicable.

And, where the moisture contained in the cellulose bearing material is used to supply the water required to absorb anhydrous acid and supply that needed as minimum for the process, it was found that a great amount of heat was generated in the absorption of the anhydrous acids in the water present. Likewise a detrimental heating effect is experienced when the concentrated acid catalyst is built up by the absorption of the anhydrous acid by a hydrous acid, which latter has been previously added to the material. The hydrated products of cellulose in their various transcendent stages are very sensitive to high temperatures. Especially is this true of the invert sugars, pentosanes and hexosanes already present in some of the cellulose bearing material. Such high temperatures caramelize these substances, or under the then prevailing reactive conditions cause the formation of humic substances, furfural, etc. So sensitive are the above referred to substances that it is extremely important to strictly and thoroughly control the reaction temperature during the absorption to the proper concentration, of the anhydrous acids by the moisture present.

Most of the means proposed for controlling or overcoming this destructive heat of reaction are based upon external cooling of the reaction vessels and thereby endeavoring to thoroughly cool all particles of the reaction mass and while this is of great benefit it has proved to be inadequate relief.

The cellulose bearing materials, such as wood, straw, etc. have a low coefficient of heat transmission and especially is this true where they are not entirely immersed in a liquid magma. This means a very-slow interchange of heat with the cooled surface of the reaction vessels and especially where a particle of cellulose bearing material is not kept in constant immediate contact with the cooled walls of the vessel. Thus, under these conditions the heat in some portions is not removed fast enough and the result is partial caramelization and production of humus substances, etc. Also this heat affects the colloidal adsorptive power of the surfaces of the fibers with detrimental effect on the yields.

To overcome these difficulties my process is as follows:

Where the required moisture is not to be supplied by means of a superabundance of strong acid the natural cellulose bearing material or cellulose bearing materials containing at least the minimum requirements of water, in some form, are subjected to a current of inert gases carrying a certain portion of gaseous hydrochloric acid, previously cooled by refrigerating means. This current of gases meets the cellulose bearing material in a counter current direction, so that the material of the greatest saturation will meet the cool gas containing the highest percentage of anhydrous acid, while the material of lowest saturation will meet a gas current almost exhausted of its acid components. The gas current is circulated through the various reaction vessels through which the material is transported, in the opposite direction to the movement of the material, by suitable conveyor and agitating device. After the gas leaves the last container, its strength is continually re-established by admixing with it fresh anhydrous gaseous acid. It then repeats the cycle through the cooler, refrigerator etc. and back into the reaction vessel.

By this procedure the first swelling and gelatinization of the cellulose component is accomplished all through the mass of fibers, so that subsequent heating with catalysts for the hydrolyzation proper is efficiently and effectively carried out in a manner that permits control of the hydrolyzing temperatures, without the disturbing over-lapping of the heat of absorption and adsorption in the material.

In order to further establish the novelty and industrial value of the described process I would call attention to the fact that a cellulose bearing material that is almost fully saturated with a gelatinizing agent, such as the proposed hydrochloric acid, is absorbing the final and last quantities of such agent very slowly, and according to the law of mass-action, will produce a very low heat of reaction. Furthermore, according to said law, the exothermic heat produced is inversely proportional to the concentration, times a factor. By my process the acid concentration in the current of inert gases can be controlled in such a way as to produce a heat of reaction which in connection with the cooling effect of the gases, will not be destructive or dangerous. Also, the speed of the current of reactive cooling gases can be varied as well as the temperature of such gases can be varied thereby making it possible to easily and absolutely control this detrimental heat.

During the further passage of the acidic gas over the progressively less acidified cellulose bearing material, the heating effect is also progressively reduced (again citing the law of mass-action) since the acidic gas in its progression automatically and progressively decreases in concentration, and thus its heating effect is progressively decreased beyond the danger point to be avoided in such saturation.

As an inert gas diluent I prefer to use flue gases previously freed from free oxygen by suitable means for reasons of economy, however any inert gas would serve the purpose.

A further advantage of such circulated and cooled diluted acidic gases is the mechanical effect of a better heat exchange, owing to the gases coming in intimate contact with every particle of the agitated raw material. The heat of reaction is carried with the gases as sensible heat. This heat is easily and effectively removed by cooling means externally situated with respect to the reaction vessels and the recooled gas currents are continuously recycled over the raw material in motion and during its progressive saturation. I also wish to mention that additional cooling control can be accomplished by removal, cooling and re-entering these cooling inert acid diluent gases into the reaction vessels at a point corresponding to partial concentration of the acid absorbing agent.

The previously mentioned method of removing some of the heat of reaction by cooling the walls of the reaction vessels may be used in conjunction with this process.

A further advantage of the circulation of cooled diluted acidic gas is the ease of control of its concentration and speed, both of which may be controlled automatically with several temperature regulating devices placed within the reaction vessels. These regulating devices actuating the means for injecting anhydrous acids into the gas cycle, as well as the means for regulating the speed of the acidic gas current.

A further advantage of circulating such cooled diluted acidic gas, during the primary gelatinization for subsequent hydrolysis, is based on the favorable colloidal condition that is produced by such procedure. There is no doubt that the excessive amount of water required during other proposed hydrolytic methods, is due to a loss in the colloidal adsorbivity of the cellulose fibers. When such colloidal adsorbivity is retained, as in my process, it has been found that the water-requirements may be kept down to an amount less than in any other proposed process, and, from an economic viewpoint it is desirable to have present only such quantities of water as are absolutely required.

Also, it has been found that when a thorough gelatinization is produced, the subsequent hydrolysis of this colloidal acid-gel may be more easily accomplished by simply boiling for a definite time and that very dilute acids will perform the final hydrolysis of the cellulose-acid gel.

The claim for the advantages of my proposed process is substantiated by the fact that the subsequent hydrolysis of the acid-gel takes place in the most rational and practical manner, and the fact that the gellying of the cellulose is not only close to the surface of the fiber, but all the way through. When the so formed acid-gel cellulose is treated with water and heated, a practically theoretical yield of invert sugar is produced.

Therefore, a further advantage of my invention is, a rational gellying of the cellulose fibers of cellulose bearing materials by means of the hereinbefore described process, wherein, the destructive side reactions are prevented in such process, making the subsequent hydrolysis of the cellulose acid-gel more easily accomplished by weak acid solutions.

To illustrate my invention the accompanying drawing is made a part of this application. Figure 1 is a diagrammatic view of one form of apparatus which may be used to carry out my process, and Fig. 2 is a sectional view through 2—2 of Fig. 1.

In the drawing, A, represents a storage bin for receiving cellulose bearing material feeding the two enclosed feed hoppers $B^1$, $B^2$, through valves $a^1$ and $a^2$ and which hoppers are provided with valves $b^1$, $b^2$, on the bottom. $B^1$ and $B^2$ are used alternately, $C^1$, $C^2$ and $C^3$ are conveyor-pipes in a superimposed position connected with each other by pipes $d^1$, $d^2$. Longitudinally and centrally within these conveyors are located helical screw conveyors on a shaft which transports and agitates the cellulose bearing material,—carrying same from feed hopper outlets, progressively to discharge pipe $d^3$, conveyor pipes $C^1$, $C^2$, $C^3$ are surrounded by cooling jackets $u^1$, $u^2$, $u^3$, through which circulates the cooling medium, entering through pipe V and leaving at W.

The acidic gas current enters the lowest conveyor pipe $C^3$, at $O^1$, progressively saturating the material until it leaves at pipe $e$, entering the centrifugal dust separator E, thence into pump or fan exhauster F, thence conveyed through pipe $f$, into tubular cooler H, composed of tube header $g$, and cooling tubes $h$. The tubular cooler H, placed within container G, through which latter water circulates entering at pipe $j$, regulated by valve $k$, and overflowing at pipe $i$. The acidic gas current thence follows pipe $l$, into refrigerator cooler K, composed of a series of tubes $m$, placed within container I, through which latter the cooling medium is circulated. The cooling medium enters through valve $p$, and leaves on top by pipe V, to enter the series of cooling jackets $u^3$, $u^2$, $u^1$, and to return from there by pipe W into the refrigerator system (not shown) to repeat the cycle. The acidic gas cooled in refrigerator cooler K, enters the mixer L, through nozzle $o$, and there mixes with anhydrous acid injected by means of valve $n$, and the mixed gases then enter lowest conveyor $C^3$ by pipe $O^1$.

The cellulose acid-gel leaves the saturator system through pipe $d^3$ and is discharged, through valve mechanism $M^1$, into evaporator conveyors $D^1$, and $D^2$. Valve device $M^1$, is so constructed that the acid-gel passes downwardly through it in such a way that no appreciable amount of the gases in $d^3$ are allowed to pass into $D^1$.

Evaporator conveyors $D^1$ and $D^2$, are pipes equipped with centrally located helical screw conveyor (as shown) which latter transports the cellulose acid-gel from valve $M^1$, to valve $M^2$, actuated horizontally at point $q^2$, $D^1$ and $D^2$ are surrounded by a jacket $y^1$—$y^2$ through which a suitable heating medium, such as hot water or oil circulates. The heating medium enters at $r^2$ and flowing through jacket $y^2$ leaves by connecting pipe $r^3$, entering jacket $y^1$, and leaves through $r^1$, to re-enter preheating means (not shown). The cellulose acid-gel discharged through valve $M^1$, traverses conveyor $D^1$, enters conveyor $D^2$, by pipe $s^1$, traverses $D^2$, leaves by $s^2$, and is alternately discharged into receivers $N^1$ and $N^2$ through valves $t^1$ and $t^2$. From receivers $N^1$ and $N^2$ the gel is removed through man holes $z^1$ and $z^2$ for further treatment. To assist evaporation in heated conveyors $D^1$ and $D^2$ a suction is maintained at $x$, by a pump (as shown).

By constructing valve $M^2$, similar to $M^1$, we may eliminate valves $t^1$ and $t^2$ and one of the N receivers or vice versa, $M^1$ may be replaced by $M^2$, $t^1$, $t^2$, $N^1$, $N^2$, and additional valves below $N^1$, and $N^2$ with pipe connections to $D^1$. Likewise $a^1$, $a^2$, $B^1$, $B^2$, $b^1$ and $b^2$ may be replaced by a valve similar to $M^1$ connecting A with $C^1$.

Also in place of the conveyors shown a container or vessel can be used, which is subdivided by a series of baffle planes which guide the material transported by suitable conveying device in the opposite direction to the gases.

The following example and description will serve to illustrate the cycle and mode of operation:

Cellulose bearing material, such as wood chips containing about forty per cent (40%) natural moisture are placed in storage bin A, valve $a^1$, being open and valve $a^2$ closed and valves $b^1$ and $b^2$, closed. After feed hopper $B^1$ is completely filled, valve $a^1$ is closed and $b^1$ opened. Now the helical screw conveyors are put in rotation and the wood chips are fed in and at the same time circulation of cooling medium started by opening valve $p$. When the wood chips reach pipe $d^1$ exhauster F is started and anhydrous acid is injected through $n$ until the gas composition reaches twenty per cent (20%) of acid. Now the inlet valve $k$ for cooling water is opened. By this time the wood material will have reached conveyor $C^2$, and as soon as the first material appears in a sight glass (not shown), in pipe $d^2$ the acid strength of the circulated gas is increased to fifty per cent (50%) by regulation at $n$. As soon as sight glass (not shown) in pipe $d^3$ indicates material reaching there, the valve motion $M^1$, is started and also suction is started through pipe $x$ and at the same time circulation of the heating medium is started through jackets $y^1$ and $y^2$.

When the material under evaporation in $D^1$, reaches $s^1$, valve $t^1$, is opened and the gate mechanism is put in motion at $M^2$. Valve $t^2$ being closed to receiver $N^2$. In the meantime feed hopper $B^2$ has begun to be charged with valve $a^2$ open and $b^2$ closed so as to be ready for operation when $B^1$ empties.

Control of reactive condition is as follows: Thermometers are placed in the center of each conveyor $C^1$, and $C^2$, and $C^3$, as well as in pipes $d^1$, $d^2$, and $d^3$. These may be regulating thermometers, in which case they would actuate valve regulation at $p$, $k$, $n$, and finally a thermostatic control of motor speed actuating pump or fan, F. The regulation would take place in successive stages in the order of the valves mentioned, or still better the last thermometer in $d^3$ would actuate fan F thermostat. Thermometer in $C^3$ actuates valve $n$, and thermometer in $C^2$ actuates valve $k$, and thermometer in $C^1$ actuates valve $p$ or the combination of these with partial actuation, or partial and combined actuation.

Thus it will be possible to maintain an even temperature of reaction throughout the material during the acid absorption and gellifying step. In order to obtain a thorough gellification of the cellulose with the given arrangement, the temperature of saccharification should not be over 120° Fahrenheit at any stage and it is best to keep the temperature under 100° Fahrenheit and during the first part of the gellification stage it is well to keep it as low as 60°–75° Fahrenheit if possible.

The process provides a flexible and simple control of reaction temperatures by the variation of 3 factors: first, the acidic strength of the gas current; secondly, the temperature of the refrigerating medium; and thirdly, the speed of the gas current, regulated by the pump or fan-speed. Each factor in itself is capable of bringing about rapid changes in reactive conditions, but especially effective, is the combination of these three factors, any two of which combined will multiply the effect in geometrical progression. For instance, assume the acid content of entering gas current is fifty per cent (50%) and the temperature is 20° Fahrenheit and its speed is one hundred per cent (100%) of an arbitrary unit speed and the jacket temperature of conveyor pipes is 50° F., and the temperature of the entering wood chips 60° F., with a moisture content of forty per cent (40%) and the temperature of exit gas current 100° F., with an acidic strength of two per cent (2%). Then, supposing a sudden rise of temperature in conveyor pipes $C^2$ and $C^3$ occurs,— the first regulative corrective measure would be to speed up fan F and the speed of entering gases to two hundred fifty per cent (250%) and at the same time decrease the strength of entering acid gas to below twenty five per cent (25%) and at the same time lower the jacket temperature of conveyor $C^3$ to below 35° F., thus combined effect would result in an immediate decrease of reaction temperature, until a desired equilibrium is reached, which will gradually produce the desired temperature. All of these controls are regulated by setting said controlling devices.

The evaporative step consists of heating the acid-gel of the cellulose content of wood chips to a suitable, and regulated temperature, while the vaporized acid gases are exhausted, condensed and further utilized. The gel freed of its major portion of acid and water is ready for further treatment or use.

Though I have described a certain process and modifications, I do not wish to be limited to the processes set forth nor to the modifications, but desire to include in the scope of my invention the processes substantially as set forth in the appended claims.

Having thus described my invention, what I claim as new and desire to secure by Letters Patent is:

1. The herein described process of saccharification of the cellulose component of cellulose bearing material, with anhydrous hydrochloric acid gas consisting in subjecting disintegrated cellulose bearing material to a counter current of said acid gas mixed with diluent cooled inert gas, wherein the cooled gas of the highest acid content meets the cellulose bearing material in motion of the highest acid saturation and continues until it contacts with the fresh cellulose bearing material when said gas mixture is in a partly exhausted acidic condition.

2. The herein described process of saccharification of cellulose bearing material by means of a cooled counter current of acid gas diluted with inert gas, consisting in recirculating the gas mixture, after said gas mixture's acid component has been progressively absorbed by the progressively unsaturated cellulose bearing material, then cooling it and injecting anhydrous acid into the exhausted gas current to build it up to its original acid strength.

3. The herein described process of saccharification of cellulose bearing material by means of a cooled counter current of acid gas diluted with inert gas, consisting in recirculating the gas mixture after said gas mixture's acid component has been progressively absorbed by the progressively unsaturated cellulose bearing material, then cooling it and injecting anhydrous acid into the exhausted gas current to build it up to its original acid strength, then removing the excess acid from saccharified product by evaporation.

4. The herein described process of saccharification of cellulose bearing material consisting in subjecting the material in a continuous cycle to a counter current of an acid gas diluted with inert gas, the gas mixture being cooled to below atmospheric temperature by external cooling, the gas mixture of highest acid content meeting the raw material of the highest acidification, the progressively exhausted gas leaving a comparatively unsaturated material, again to return into the cycle after the acid content is brought back to original strength by means of a regulated admixture of anhydrous acid gas.

In testimony whereof, I have hereunto set my hand at Los Angeles, California, this 25th day of June, 1925.

JOHN PERL.